(12) United States Patent
Gale et al.

(10) Patent No.: US 8,937,787 B2
(45) Date of Patent: Jan. 20, 2015

(54) HUMIDITY AND TEMPERATURE CONTROLLED TAPE DRIVE CLEANING

(71) Applicant: International Business Machines Corporation, Armonk, NY (US)

(72) Inventors: Ernest S. Gale, Tucson, AA (US); Khanh V. Ngo, Tucson, AZ (US); Charles V. Polkiewicz, Tucson, AZ (US)

(73) Assignee: International Businesss Machines Corporation, Armonk, NY (US)

( * ) Notice: Subject to any disclaimer, the term of this patent is extended or adjusted under 35 U.S.C. 154(b) by 0 days.

(21) Appl. No.: 14/316,700

(22) Filed: Jun. 26, 2014

(65) Prior Publication Data
US 2014/0307346 A1 Oct. 16, 2014

Related U.S. Application Data

(63) Continuation of application No. 13/733,844, filed on Jan. 3, 2013, now Pat. No. 8,804,277.

(51) Int. Cl.
*G11B 33/08* (2006.01)
(52) U.S. Cl.
USPC ........................................... 360/97.12
(58) Field of Classification Search
USPC ........... 360/31, 126, 69, 128, 53, 92.1, 97.12; 369/92.1, 15, 97, 91
See application file for complete search history.

(56) References Cited

U.S. PATENT DOCUMENTS

| | | | |
|---|---|---|---|
| 5,381,292 A | 1/1995 | Richmond |
| 5,701,224 A | 12/1997 | Sakui |
| 5,701,234 A | 12/1997 | Wong |
| 6,215,618 B1 | 4/2001 | Anderson et al. |
| 6,624,960 B1 | 9/2003 | Langiano et al. |
| 6,654,194 B1 | 11/2003 | Masuda et al. |
| 6,687,071 B2 | 2/2004 | Nagai et al. |
| 6,757,123 B2 | 6/2004 | Masuda et al. |
| 7,016,136 B2 | 3/2006 | Shiratori et al. |
| 7,321,478 B2 | 1/2008 | Mackelden et al. |
| 8,477,448 B2 | 7/2013 | Thompson et al. |
| 8,804,277 B2 | 8/2014 | Gale et al. |
| 2014/0185161 A1 | 7/2014 | Gale et al. |

FOREIGN PATENT DOCUMENTS

JP 9022514 1/1997

OTHER PUBLICATIONS

U.S. Appl. No. 13/733,844, filed Jan. 3, 2013.
Non-Final Office Action from U.S. Appl. No. 13/733,844 dated Dec. 27, 2013.
Notice of Allowance and Fee(s) Due from U.S. Appl. No. 13/733,844 dated Apr. 7, 2014.

*Primary Examiner* — Nabil Hindi
(74) *Attorney, Agent, or Firm* — Zilka-Kotab, PC

(57) ABSTRACT

In one embodiment, a method includes making a determination whether to modify a cleaning cycle, e.g., of a tape drive, based at least in part on at least one of: an age of one or more tapes, a type of one or more tapes, and an identity of a vendor of one or more tapes. A selection and/or modification of a timing of a cleaning operation is made based on the determination.

20 Claims, 13 Drawing Sheets

HUMIDITY AND TEMPERATURE CONTROLLED TAPE DRIVE CLEANING

RELATED APPLICATIONS

This application is a continuation of copending U.S. patent application Ser. No. 13/733,844, filed Jan. 3, 2013, which is herein incorporated by reference.

BACKGROUND

The present invention relates to data storage systems, and more particularly, this invention relates to system, method and computer program product for providing humidity and temperature controlled tape drive cleaning.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

In one embodiment, a method includes making a determination whether to modify a cleaning cycle based at least in part on at least one of: an age of one or more tapes, a type of one or more tapes, and an identity of a vendor of one or more tapes. A selection and/or modification of a timing of a cleaning operation is made based on the determination.

In another embodiment, a system includes a magnetic head, a drive mechanism for a drive mechanism for passing a magnetic medium over the magnetic head, and a controller in communication with the magnetic head. The controller is configured and/or programmable to: make a determination whether to modify a cleaning cycle based at least in part on at least one of: an age of one or more tapes, a type of one or more tapes, and an identity of a vendor of one or more tapes; and make a selection and/or modification of a timing of a cleaning operation based on the determination of whether to modify a cleaning cycle.

In yet another embodiment, a computer program product includes a computer readable storage medium having program code embodied therewith, the program code readable/executable by a processor to: receive at least one of temperature information and humidity information about an environment in which a tape drive resides, perform an analysis of the at least one of temperature information and humidity information, make a determination whether to modify a cleaning cycle based on the analysis of the at least one of temperature information and humidity information, make a selection and/or modification of a timing of a cleaning operation for cleaning the tape drive based on the determination.

In a further embodiment, a method includes receiving at a tape drive at least one of temperature information and humidity information about an environment in which a tape drive resides, performing an analysis of the at least one of temperature information and humidity information, making a determination whether to modify a cleaning cycle, wherein the determination whether to modify the cleaning cycle is based on the analysis of the at least one of temperature information and humidity information, wherein the analysis includes making a determination that the at least one of temperature information and humidity information is in a predetermined range for a predetermined period of time, making a selection and/or modification of a timing of a cleaning operation of the tape drive based on the determination whether to modify the cleaning cycle, and at least one of: an age of one or more tapes used in the tape drive, a type of one or more tapes used in the tape drive, and an identity of a vendor of one or more tapes tape used in the tape drive, wherein the analysis of the at least one of temperature and humidity information, the determination whether to modify the cleaning cycle, and the selection and/or modification of the timing of the cleaning operation of the tape dive is performed by the tape drive.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
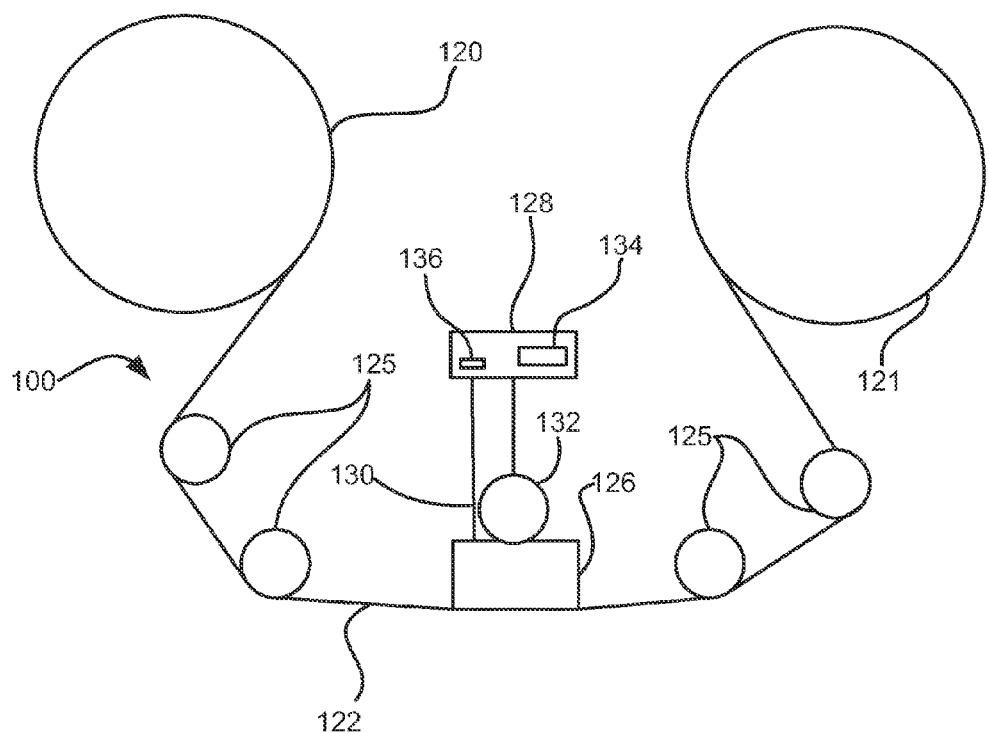
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a method includes receiving at least one of temperature information and humidity information about an environment in which a tape drive resides, performing an analysis of the at least one of temperature information and humidity information, making a determination whether to modify a cleaning cycle based on the analysis of the at least one of temperature information and humidity information, and making a selection and/or modification of a timing of a cleaning operation of the tape drive based on the determination.

In another general embodiment, a system includes a magnetic head, a drive mechanism for a drive mechanism for passing a magnetic medium over the magnetic head, and a controller in communication with the magnetic head, wherein the controller is configured and/or programmable to: receive at least one of temperature information and humidity information about an environment in which a tape drive resides, the tape drive having the magnetic head and the drive mechanism, perform an analysis of the at least one of temperature information and humidity information, make a determination whether to modify a cleaning cycle based on the analysis of the at least one of temperature information and humidity information, make a selection and/or modification of a timing of a cleaning operation of the tape drive based on the determination of whether to modify a cleaning cycle.

In yet another general embodiment, a computer program product includes a computer readable storage medium having program code embodied therewith, the program code readable/executable by a processor to: receive at least one of temperature information and humidity information about an environment in which a tape drive resides, perform an analysis of the at least one of temperature information and humidity information, make a determination whether to modify a cleaning cycle based on the analysis of the at least one of temperature information and humidity information, make a selection and/or modification of a timing of a cleaning operation of the tape drive based on the determination.

In a further general embodiment, a method includes receiving at a tape drive at least one of temperature information and humidity information about an environment in which a tape drive resides, performing an analysis of the at least one of temperature information and humidity information, making a determination whether to modify a cleaning cycle, wherein the determination whether to modify the cleaning cycle is based on the analysis of the at least one of temperature information and humidity information, wherein the analysis includes making a determination that the at least one of temperature information and humidity information is in a predetermined range for a predetermined period of time, making a selection and/or modification of a timing of a cleaning operation of the tape drive based on the determination whether to modify the cleaning cycle, and at least one of: an age of one or more tapes used in the tape drive, a type of one or more tapes used in the tape drive, and an identity of a vendor of one or more tapes tape used in the tape drive, wherein the analysis of the at least one of temperature and humidity information, the determination whether to modify the cleaning cycle, and the selection and/or modification of the timing of the cleaning operation of the tape dive is performed by the tape drive.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
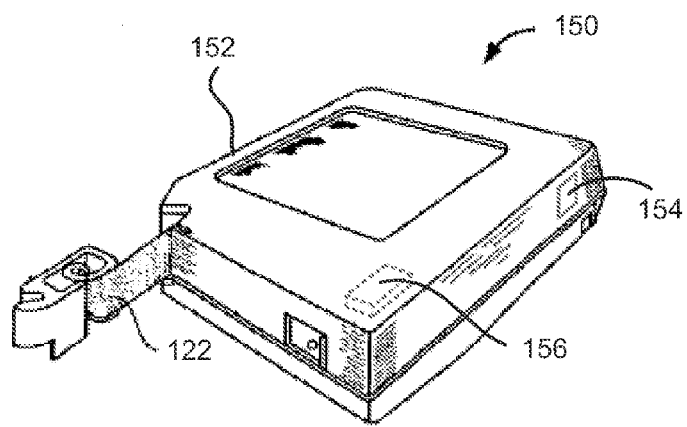
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
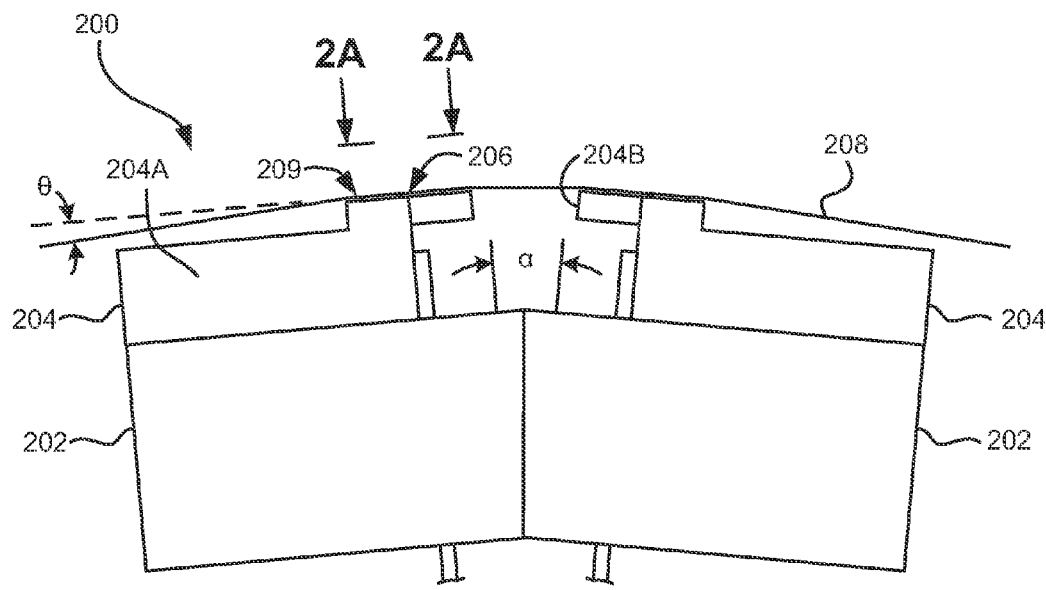
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
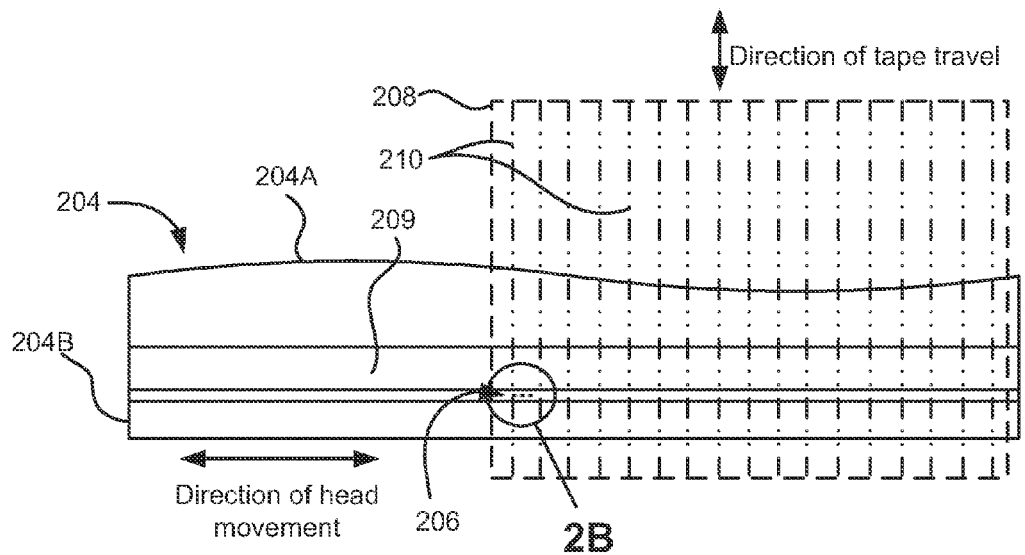
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
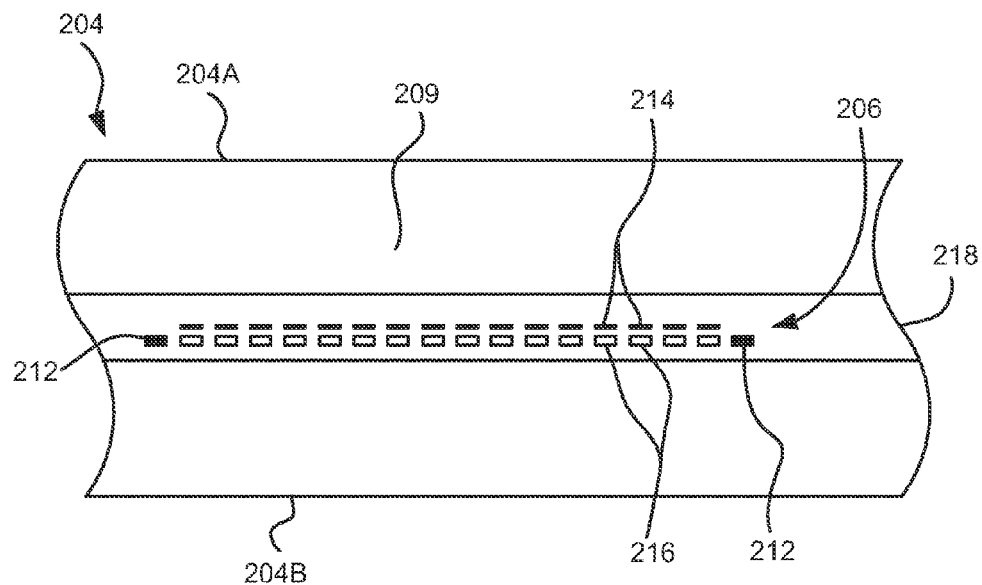
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
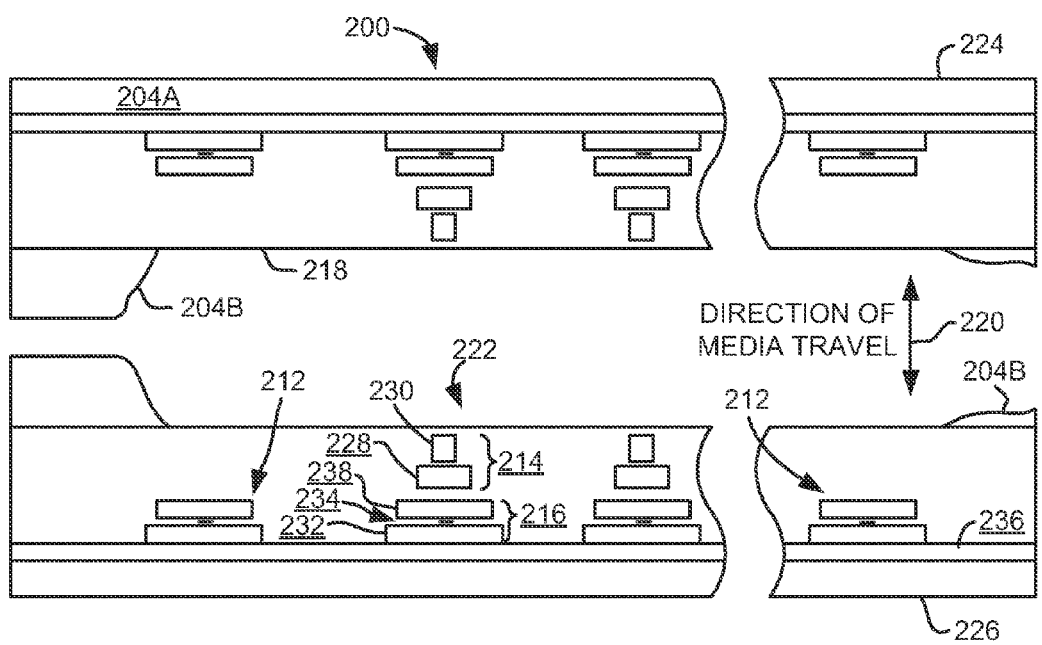
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
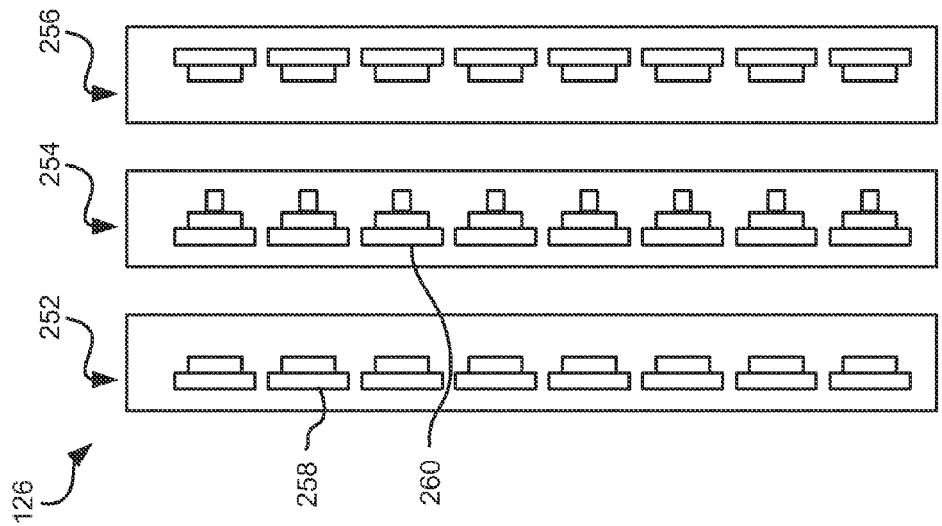
FIG. 4 is a partial tape bearing surface view of a magnetic head having a read-write-read configuration.
Figure 3:
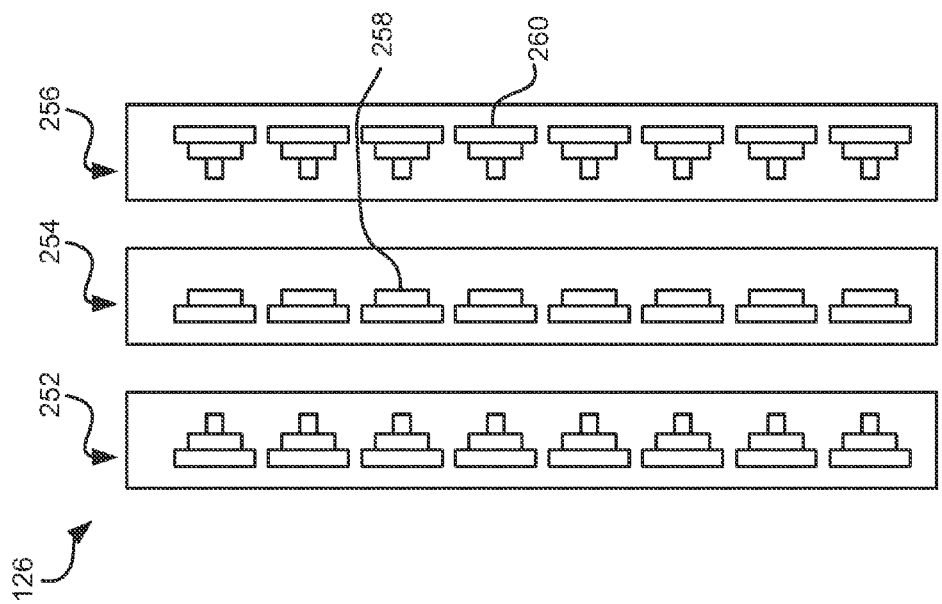
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
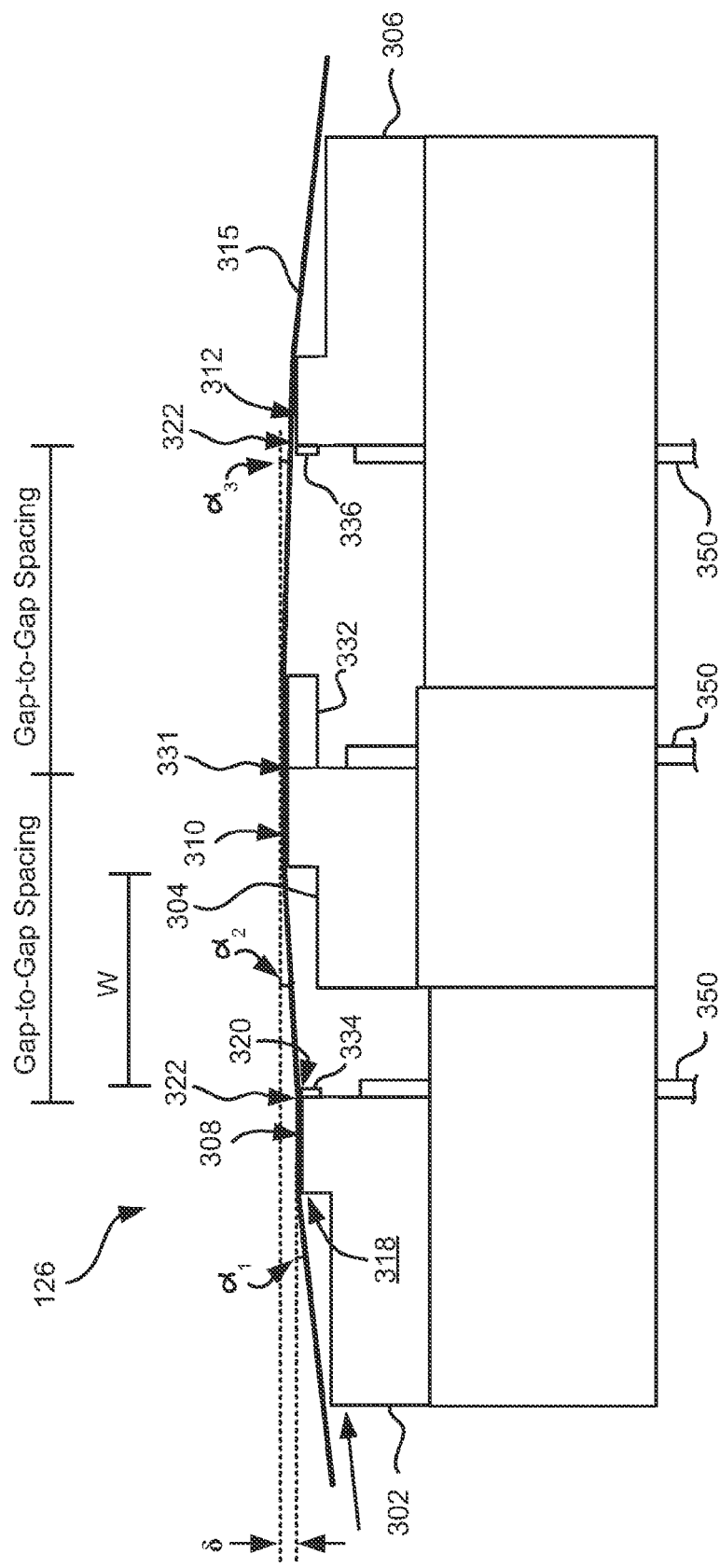
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
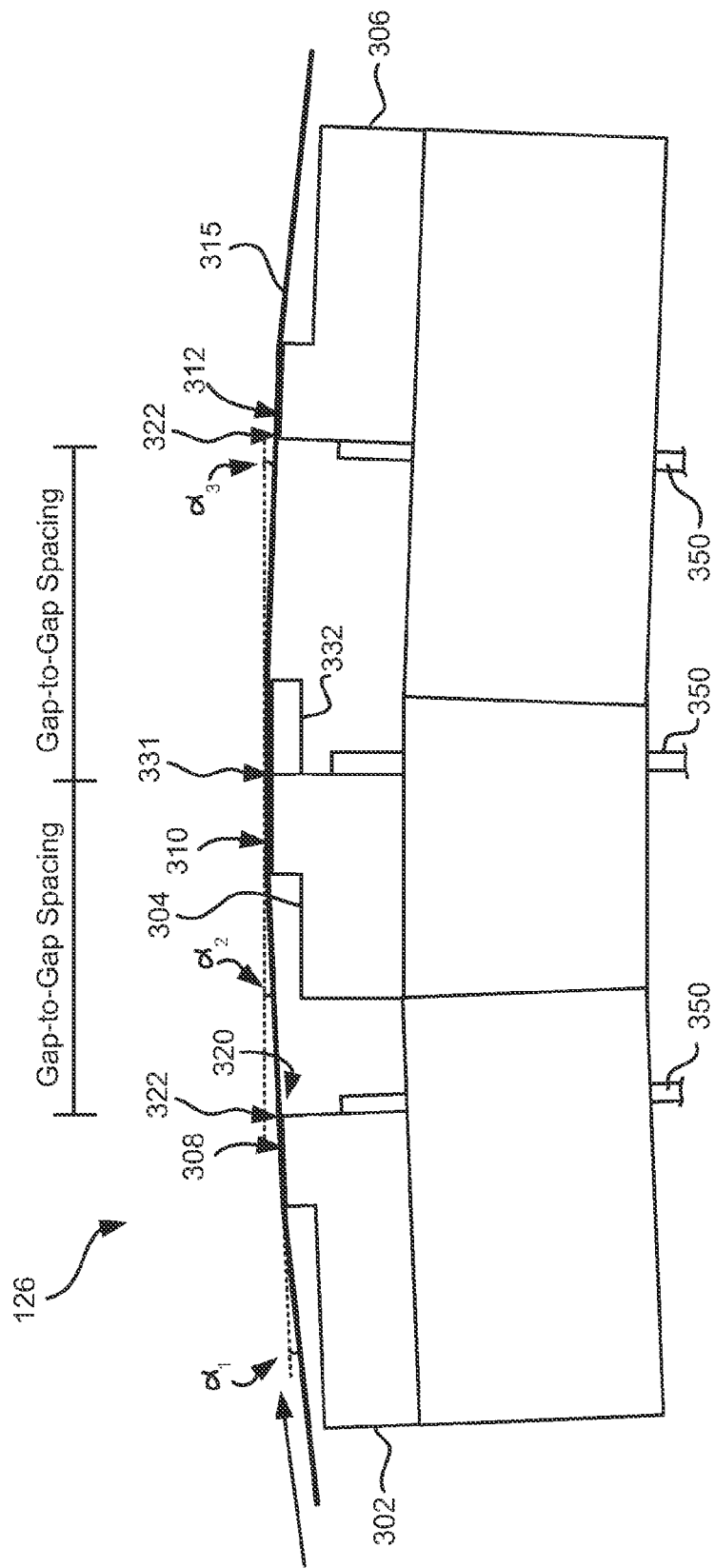
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
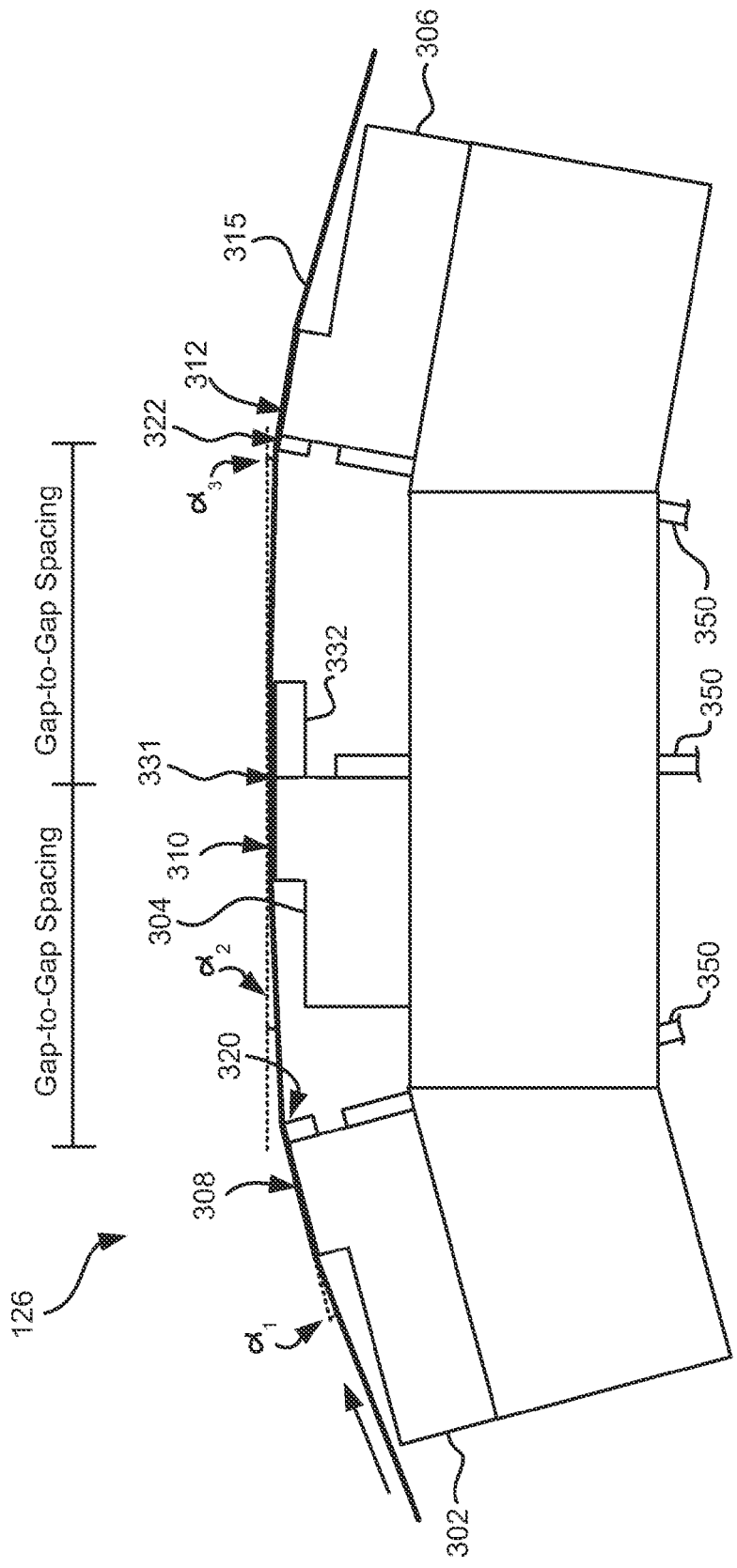
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

Conventional tape drives are typically designed to operate in various environmental conditions, including both high and low temperature and humidity ranges. Debris buildup in tape drives most often occurs in low relative temperature humidity environments. Debris buildup on the magnetic heads of a tape drive often results in marked increases in reading and writing times. Additionally, debris buildup on the tape itself often results in the spread of the debris from tape drive to tape drive, similarly resulting in longer read and write times. Despite the problems associated with variable rates of debris buildup, cleaning cycles of conventional tape drives are generally the same for all environments.

Embodiments disclosed herein overcome the aforementioned drawbacks by providing a system, method and computer program product for automating a tape drive cleaning operation as a function of temperature and/or humidity. In preferred embodiments, information concerning an environmental condition, such as temperature information and/or humidity information, may be derived from one or more sensors on a tape drive or a canister coupled thereto; and/or from one or more sensors located remotely from the tape drive, e.g., inside or outside a tape library; etc. or any combination thereof. In further embodiments, the information may be received and analyzed by the tape drive, a controller located remotely from the tape drive (e.g., a library controller), etc., in order to determine whether a cleaning cycle should be selected and/or modified.

Figure 8:
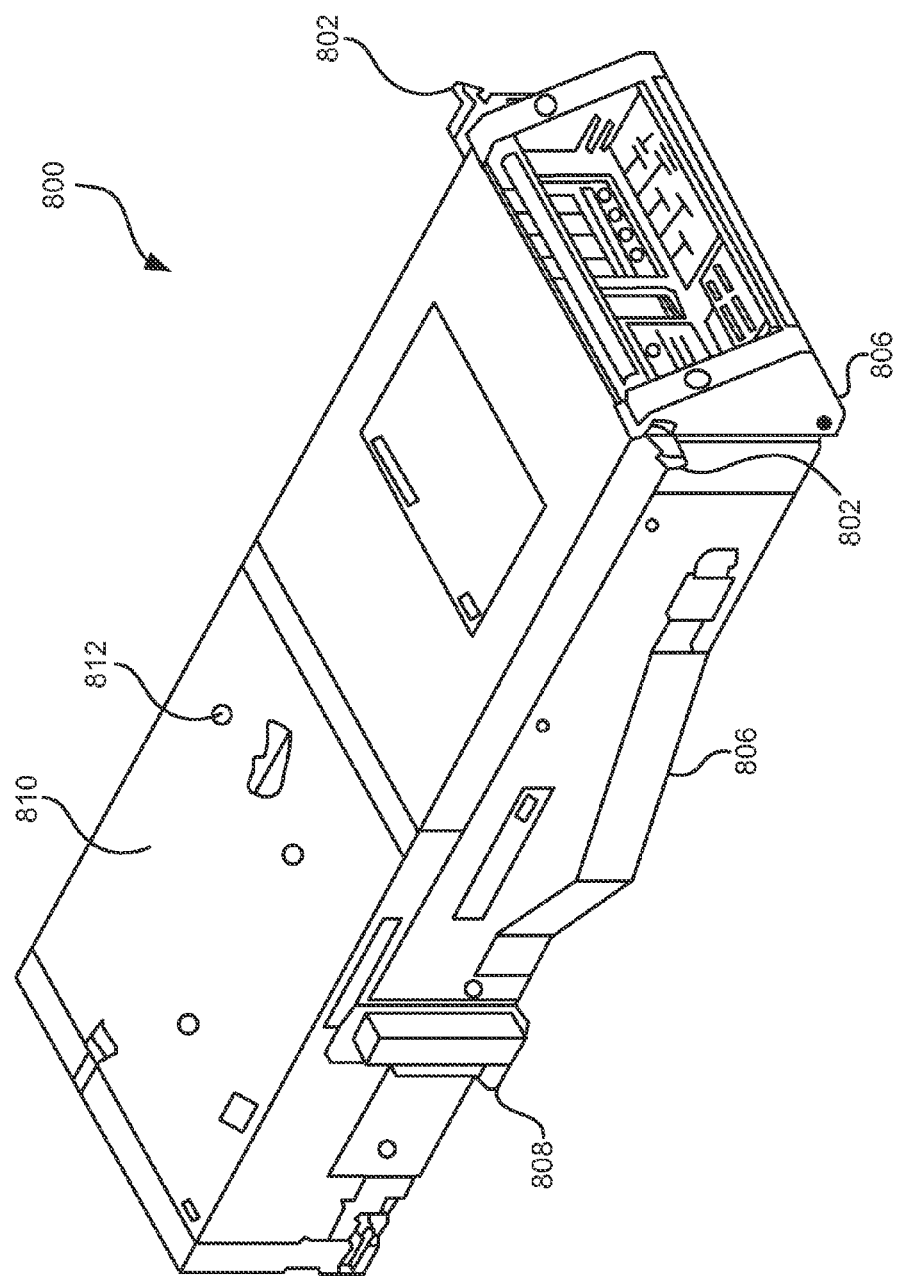
FIG. 8 illustrates a tape drive canister, according to one embodiment.

FIG. 8 shows a rear perspective view of a tape drive canister 800 according to one embodiment. Several components 806 may be used to achieve a mechanical docking to an automated tape library. Also shown are latches 802 for mechanical docking to a tape library, a side-docking card 804 to allow mechanical docking into the tape library, a front-facing electrical docking connector 808 for electrical communication with the tape library. A tape drive brick 810 is coupled to the tape drive canister 800.

One or more sensors 812 may be located on the tape drive brick 810 (as shown in FIG. 8) and/or the tape drive canister 800 coupled thereto. In some embodiments, the one or more sensors may measure, detect, derive, etc., various environmental conditions, including but not limited to, temperature information, humidity information, etc. or any combination thereof.

Automated tape libraries are generally large storage devices that have a robotic accessor that moves tape cartridges between storage shelves and tape drives in the library. The tape drives are typically put in canisters which act as a sled or conveyance device to allow the tape drives to more easily be inserted and removed from the automated tape library as well as provide an interface for power and communications between the automated tape library and the tape drive. Very often these tape drive canisters 'hot dock' into the automated tape library such that as soon as the tape drive canister is fully seated into a slot in the automated tape library, the electrical connection is established between the tape drive canister and electronics of the automated tape library. The tape drive canisters may then be held in this 'docked' position using some physical mechanism, such as a latch, thumbscrew, catch, friction fitting, etc.

Figure 9A:
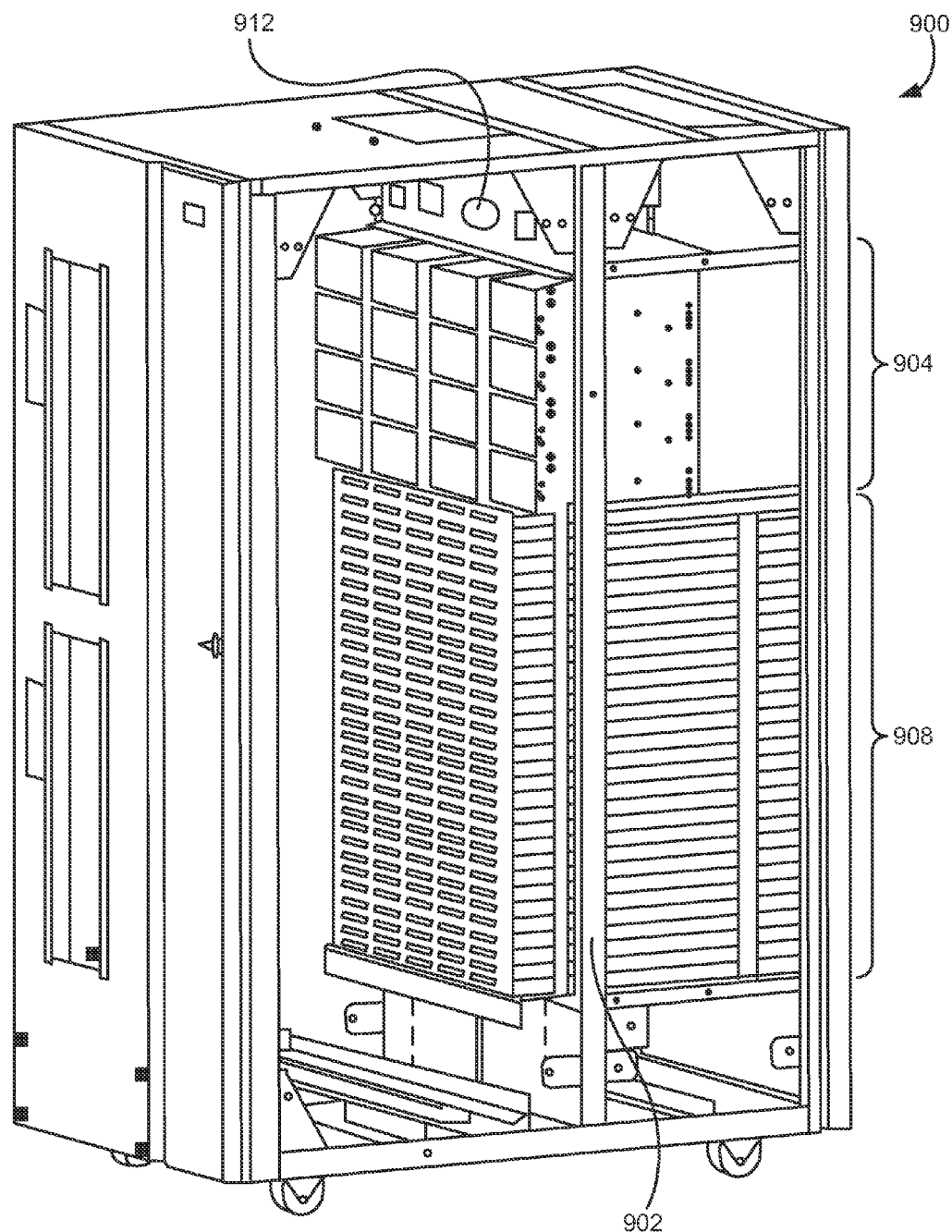
FIGS. 9A-9C show a plurality of tape drive canisters installed in a tape library, according to one embodiment.

FIG. 9A is an isometric view of a tape library 900 according to one embodiment. While no robotic accessor is shown, one is typically present for transporting tape cartridges to and from the drives, as would be understood by one skilled in the art upon reading the present description. One or more sensors 912 may be located within the frame 902 of the tape library 900. In various embodiments, the one or more sensors may measure, detect, derive, etc., various environmental conditions, including but not limited to, temperature information, humidity information, etc. or any combination thereof.

Figure 9B:
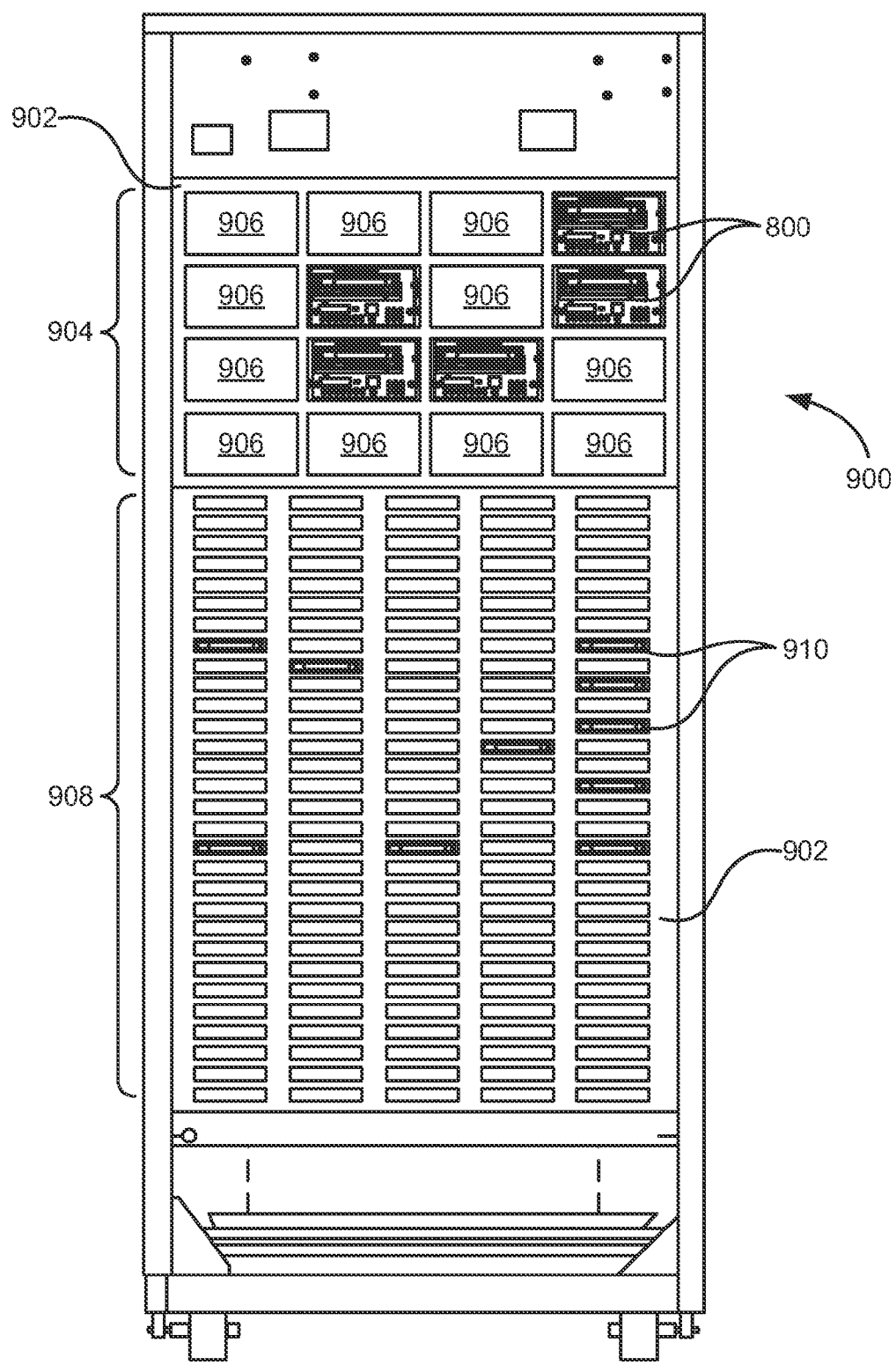

FIG. 9B is a front view of a tape library 900 with the front door removed to better show the dense packing of tape drive canisters 800.

Figure 9C:
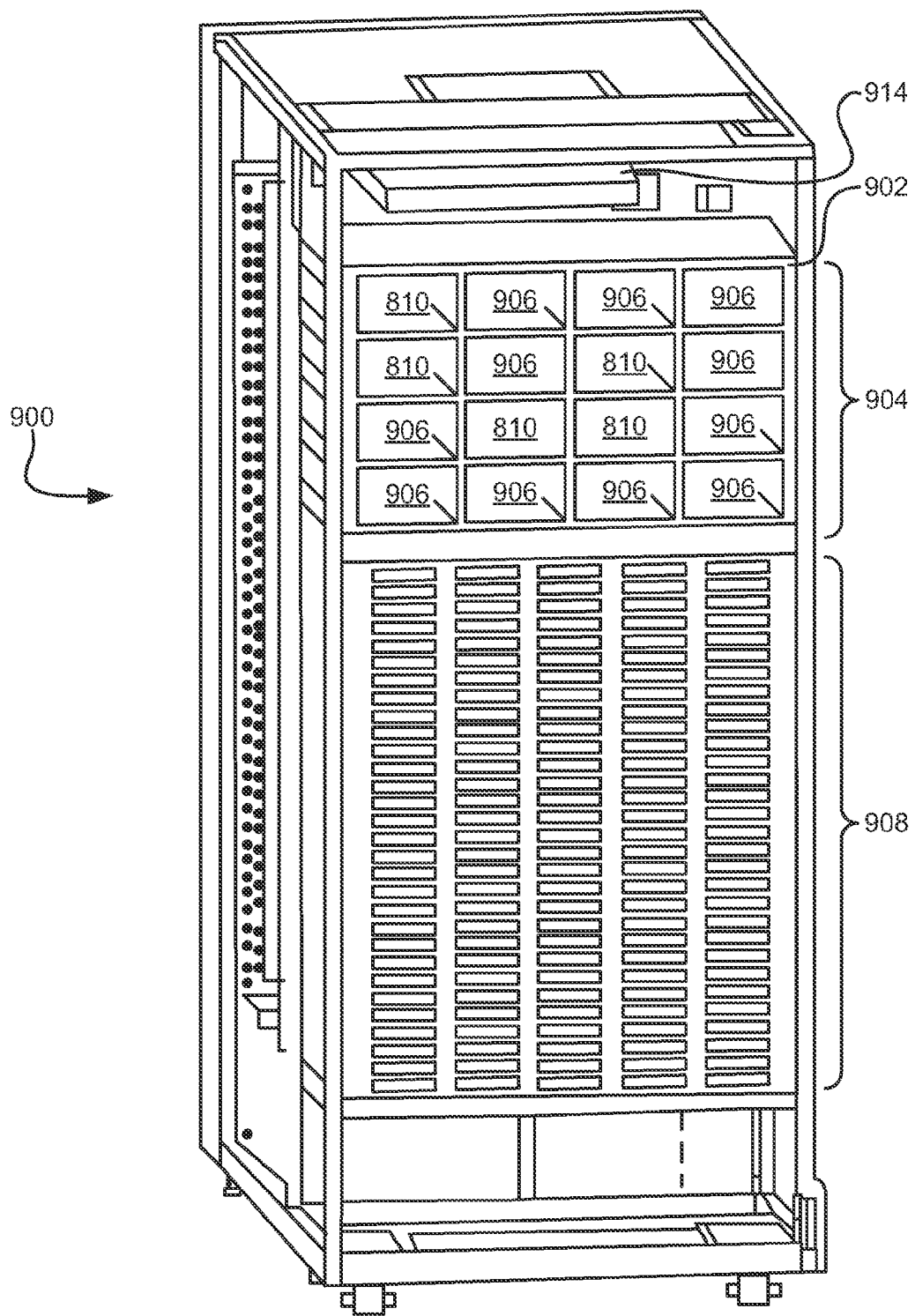

FIG. 9C shows a rear view of the tape library 900 with the rear door removed to show the dense packing of tape drive canister bays 906 which are adapted for accepting tape drive canisters. Some tape drives 810 are shown in the bays 906. A library controller 914 of a type known in the art may also be present. Such controller may be programmed, modified, etc. to provide aspects of the present invention.

As can be seen from FIGS. 9A-9C, the tape drive canisters 800 may be packed into the frame 902, thereby allowing, several tape drive canisters 800 to be positioned in a tape drive canister bay array 904 in an upper portion of the frame 902 while a plurality of tape cartridges 910 are capable of being stored in a plurality of tape cartridge storage shelves 908 in a lower portion of the frame 902.

Figure 10:
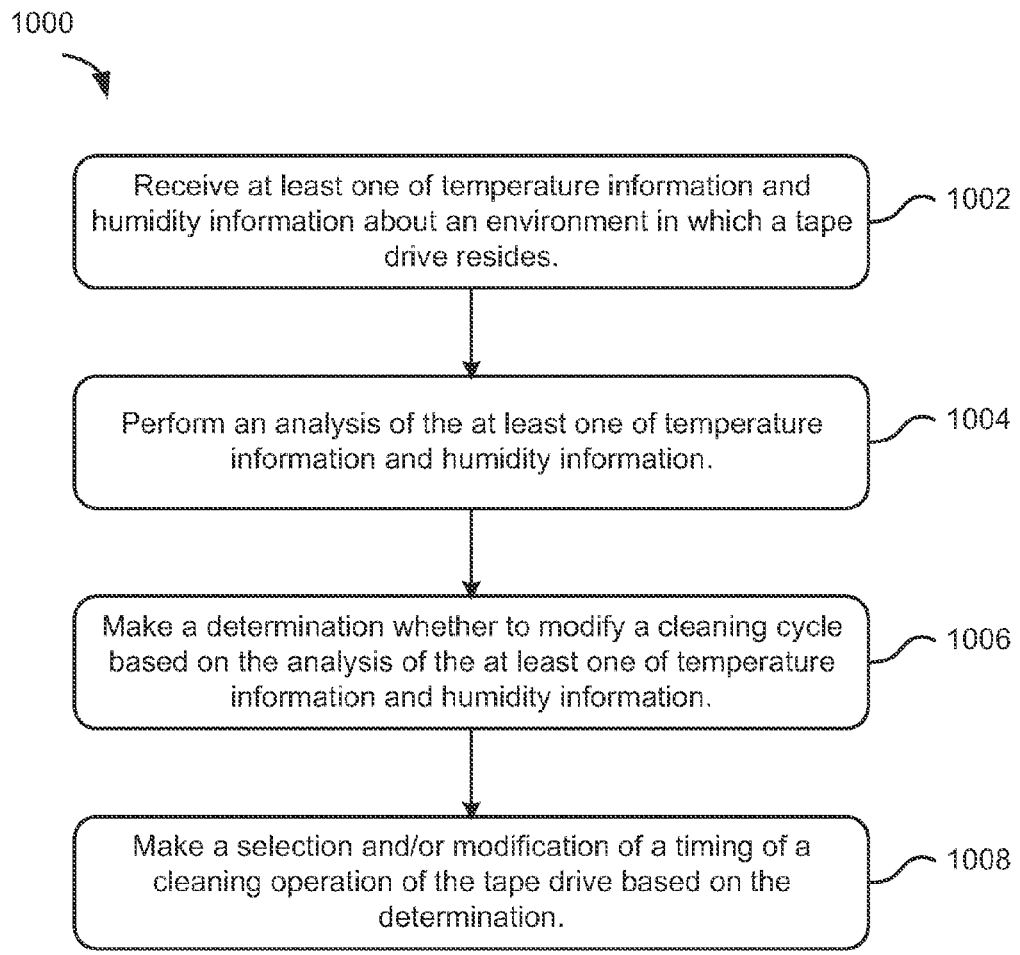
FIG. 10 is a flow diagram of a method according to one embodiment.

Referring now to FIG. 10, a method 1000 for temperature controlled and humidity controlled tape drive cleaning is shown according to one illustrative embodiment. As an option, the present method 1000 may be implemented in conjunction with features from any other embodiments listed herein, such as those shown in the other FIGS. Of course, however, this method 1000 and others presented herein may be used in various applications and/or permutations, which may or may not be related to the illustrative embodiments listed herein. Further, the method 1000 presented herein may be carried out in any desired environment. Moreover, more or less operations than those shown in FIG. 10 may be included in method 1000, according to various embodiments.

As shown in FIG. 10 according to one approach, the method 1000 includes receiving at least one of temperature information and humidity information about an environment in which a tape drive resides. See operation 1002.

In one embodiment, the temperature information and/or humidity information may be received by the tape drive. In another embodiment, the temperature information and/or humidity information may be received by a controller located remotely from the tape drive. As used herein, a controller may include but is not limited to, a library controller or other such suitable controller as would be understood by one having skill in the art upon reading the present disclosure.

In yet another embodiment one of temperature information and/or humidity information may be received by the tape drive, where another of temperature information and/or humidity information may be received by a controller located remotely from the tape drive. Each device may process the information separately, one device may forward the information to the other device for processing there, etc.

In a further embodiment, the temperature information and/or humidity information may be derived from one or more sensors on the tape drive or a canister coupled thereto. According to another embodiment, the temperature information and/or humidity information may be derived from one or more sensors located remotely from the tape drive. For example, the one or more sensors may be located in a tape library in various embodiments.

According to yet another embodiment, the temperature information and/or humidity information may be derived from one or more sensor located remotely from the tape drive, e.g. a tape library, wherein another of the temperature information and/or humidity information may be derived from one or more sensors located on the tape drive or a canister coupled thereto.

With continued reference to FIG. 10, the method 1000 also includes performing an analysis of the at least one of temperature information and humidity information. See operation 1004.

According to one approach, the analysis of the temperature information and/or humidity information may be performed by the tape drive. In another approach, the analysis of the temperature information and/or humidity information may be performed by a controller located remotely from the tape drive. In yet another approach, the analysis of the temperature information and/or humidity information may be performed by a controller located remotely from the tape drive, such as a library controller, a host, etc., while another of the temperature information and/or humidity information may be performed by the tape drive.

In some approaches, the temperature information and/or humidity information may be received by the tape drive, and the analysis of the temperature information and/or humidity information may be performed by the tape drive. In other approaches, the temperature information and/or humidity information may be received by a controller located remotely from the tape drive, and the analysis of the temperature information and/or humidity information may be performed by the controller located remotely from the tape drive. It is important to note that there are many combinations for the receipt of the temperature information and/or humidity information and the analysis of the temperature information and/or humidity information that may be created based on the embodiments described herein, as would be recognized by one having skill in the art upon reading the present disclosure.

In additional approaches, the analysis of the temperature information and/or humidity information may include determining whether the temperature information and/or humidity information is in a predetermined range for a predetermined period of time. In some embodiments, the range may be pre-set (e.g., at installation), may be determined at or after some interval based on parameters such as a historic operating temperature, etc. or any combination thereof. Additionally, in other embodiments the range may include a sensor value above or below a threshold. In various embodiments, the range may be selected to prevent any action based on a spike in the temperature information and/or humidity information. As used herein, a spike may include any value that is not within the predetermined range and that persists for a time period less than the predetermined time period. For example, where there is merely a spike in the temperature information and/or humidity information and said spike does not persist for the predetermined time period, no action (e.g. a modification of a cleaning cycle) may be necessary.

Further, in some embodiments, the predetermined time period and/or any interval between the predetermined time periods, may be periodic, varied, computed, received, calculated based on some criteria such as the rate at which temperature information and/or humidity information changes, etc.

By way of example only, one illustrative embodiment may include receiving the temperature information and/or humidity information every five minutes, and performing an analysis of whether the temperature information and/or humidity information remains in a predetermined range for a predetermined 3 hour time period. Where the temperature information and/or humidity information remains in the predetermined range for the predetermined 3 hour time period, a first cleaning cycle may be selected. However, where the temperature information and/or humidity information does not fall within the predetermined range for the predetermined 3 hour time period, a second cleaning cycle may be selected, where the second cleaning cycle is different than the first cleaning cycle; the first cleaning cycle may be selected and modified; etc.

Again with reference to FIG. 10, the method 1000 includes making a determination whether to modify a cleaning cycle based on the analysis of the at least one of temperature information and humidity information, and making a selection and/or modification of a timing of a cleaning operation of the tape drive based on the determination. See operations 1006 and 1008, respectively.

In some embodiments, the timing of the cleaning operation may include the frequency of the cleaning operation, the length of the cleaning operation, etc. or any combination thereof.

Furthermore, in various embodiments, the selection and/or modification of the timing of the cleaning operation is further modified based at least in part on other factors such as an age of one or more tapes used in the tape drive, a type of one or more tapes used in the tape drive, an identity of a vendor of one or more tapes tape used in the tape drive, etc. Such information may be determined based on a presently-loaded tape, historical data about tapes loaded in the tape drive, etc. and combinations thereof. In one exemplary embodiment, knowledge that use of media from certain vendors in particular temperature and/or humidity ranges results in more rapid fouling of a drive may be used to alter the timing of cleaning the drive more often. Thus, while temperature and humidity are major factors for determining timing of cleanings, other factors may be combined to make better and smarter decisions about how to alter the timing.

Figure 11:
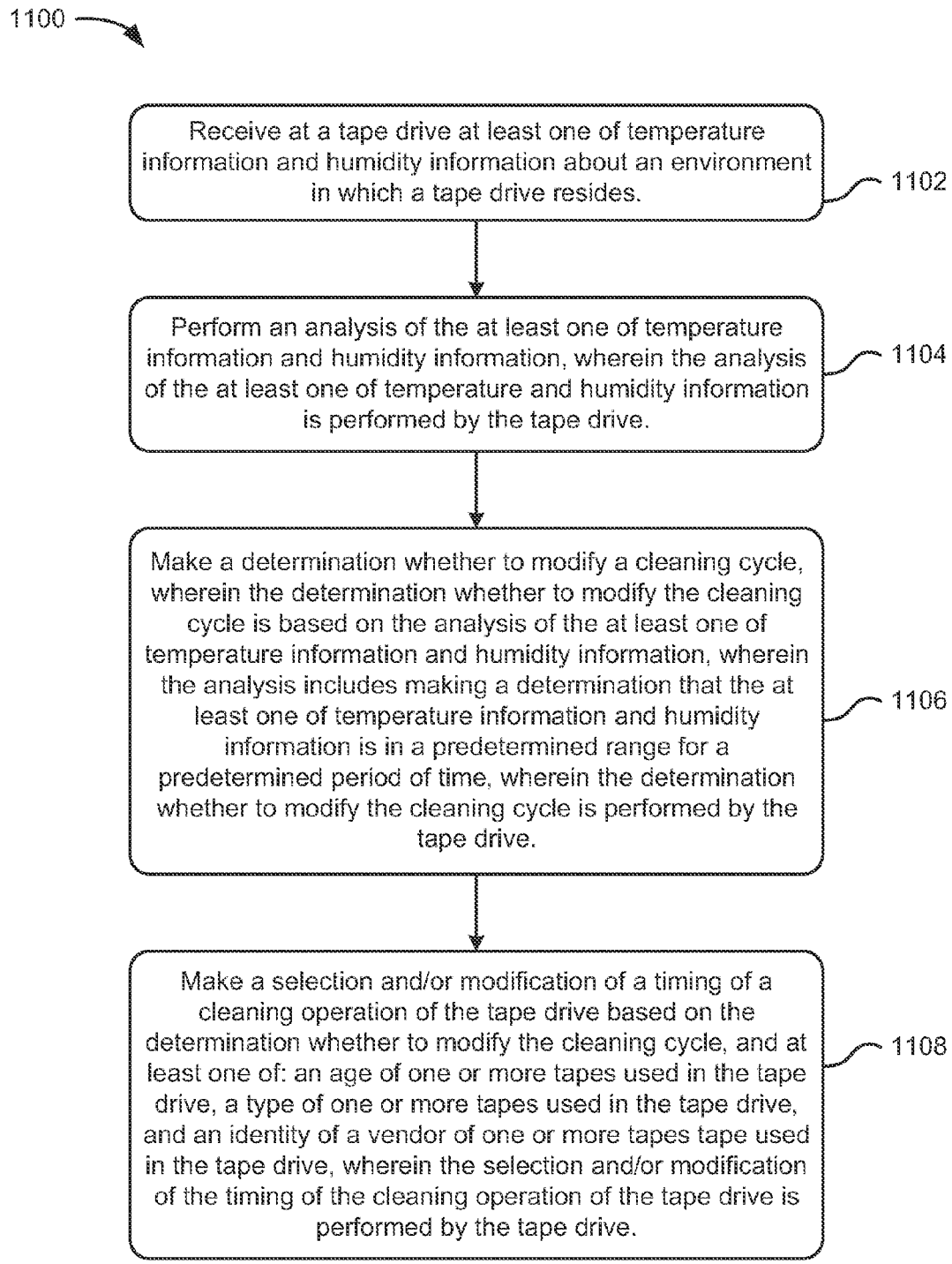
FIG. 11 is a flow diagram of a method according to one embodiment.

Referring now to FIG. 11, a method 1100 for temperature controlled and humidity controlled tape drive cleaning is shown according to one illustrative embodiment. As an option, the present method 1100 may be implemented in conjunction with features from any other embodiments listed herein, such as those shown in the other FIGS. Of course, however, this method 1100 and others presented herein may be used in various applications and/or permutations, which may or may not be related to the illustrative embodiments listed herein. Further, the method 1100 presented herein may be carried out in any desired environment. Moreover, more or less operations than those shown in FIG. 11 may be included in method 1100, according to various embodiments.

As shown in FIG. 11 according to one approach, the method 1000 includes receiving at a tape drive at least one of temperature information and humidity information about an environment in which a tape drive resides. See operation 1002.

In one embodiment one of temperature information and/or humidity information may be received by the tape drive directly from a sensor, where another of temperature information and/or humidity information may be received by a controller located remotely from the tape drive and sent to the tape drive for processing.

Per operation 1104, the method 1100 also includes performing an analysis of the at least one of temperature information and humidity information, where the analysis of the at least one of temperature information and humidity information is performed by the tape drive.

In operation 1106, the method 1100 includes making a determination whether to modify a cleaning cycle, where the determination whether to modify the cleaning cycle is based on at the analysis of the at least one of temperature information and humidity information, wherein the analysis included making a determination that the at least one of temperature information and humidity information is in a predetermined range for a predetermined period of time. The determination of whether to modify the cleaning cycle is performed by the tape drive, as shown in FIG. 11.

Further, the method 1100 additionally includes making a selection and/or modification of a timing (e.g. the frequency, length, etc.) of a cleaning operation of the tape drive based on the determination whether to modify the cleaning cycle, and at least one of: an age of one or more tapes used in the tape drive, a type of one or more tapes used in the tape drive, and an identity of a vendor of one or more tapes tape used in the tape drive. See operation 1108. As also shown in FIG. 11, the selection and/or modification of the timing of the cleaning operation of the tape dive is performed by the tape drive.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
making a determination whether to modify a cleaning cycle based at least in part on at least one of: an age of one or more tapes, a type of one or more tapes, and an identity of a vendor of one or more tapes; and
making a selection and/or modification of a timing of a cleaning operation based on the determination.

2. A method as recited in claim 1, comprising performing the cleaning operation on a head of a tape drive according to the timing.

3. A method as recited in claim 1, comprising performing an analysis of at least one of temperature information and humidity information, wherein the analysis includes determining whether the at least one of temperature information and humidity information is in a predetermined range for a predetermined period of time, and comprising making a determination whether to modify a cleaning cycle based on the analysis of the at least one of temperature information and humidity information.

4. A method as recited in claim 1, wherein the determining is performed by a tape drive to be cleaned during the cleaning operation.

5. A method as recited in claim 1, wherein the determining is performed by a controller located remotely from a tape drive to be cleaned during the cleaning operation.

6. A method as recited in claim 1, wherein the at least one of temperature information and humidity information is derived from one or more sensors on a tape drive to be cleaned during the cleaning operation and/or a canister coupled thereto.

7. A method as recited in claim 1, comprising performing an analysis of at least one of temperature information and humidity information, wherein the at least one of temperature information and humidity information is derived from one or more sensors located remotely from a tape drive to be cleaned during the cleaning operation, and comprising making a determination whether to modify a cleaning cycle based on the analysis of the at least one of temperature information and humidity information.

8. A method as recited in claim 7, wherein the at least one of temperature information and humidity information is received by the tape drive, wherein the analysis of the at least one of temperature information and humidity information is performed by the tape drive.

9. A method as recited in claim 1, comprising performing an analysis of at least one of temperature information and humidity information, wherein one of the temperature information and humidity information is derived from one or more sensors located remotely from a tape drive to be cleaned during the cleaning operation, wherein another of the temperature information and humidity information is derived from one or more sensors located on the tape drive or a canister coupled thereto, and comprising making a determination whether to modify a cleaning cycle based on the analysis of the at least one of temperature information and humidity information.

10. A system; comprising:
a magnetic head;
a drive mechanism for a drive mechanism for passing a magnetic medium over the magnetic head; and
a controller in communication with the magnetic head, wherein the controller is configured and/or programmable to:
make a determination whether to modify a cleaning cycle based at least in part on at least one of: an age of one or more tapes, a type of one or more tapes, and an identity of a vendor of one or more tapes; and make a selection and/or modification of a timing of a cleaning operation based on the determination of whether to modify a cleaning cycle.

11. A system as recited in claim 10, wherein the controller is configured to cause performance of the cleaning operation on the magnetic head according to the timing.

12. A system as recited in claim 10, wherein the controller is configured and/or programmable to perform an analysis of at least one of temperature information and humidity information, wherein the analysis of the at least one of temperature information and humidity information includes determining whether the at least one of temperature information and humidity information is in a predetermined range for a predetermined period of time, wherein the controller is configured and/or programmable to make a determination whether to modify a cleaning cycle based on the analysis of the at least one of temperature information and humidity information.

13. A system as recited in claim 10, wherein the controller is in a tape drive.

14. A system as recited in claim 10, wherein the controller is located remotely from a tape drive to be cleaned during the cleaning operation.

15. A system as recited in claim 10, wherein the controller is configured and/or programmable to perform an analysis of at least one of temperature information and humidity information, wherein the at least one of temperature information and humidity information is derived from one or more sensors on a tape drive to be cleaned during the cleaning operation and/or a canister coupled thereto, wherein the controller is configured and/or programmable to make a determination whether to modify a cleaning cycle based on the analysis of the at least one of temperature information and humidity information.

16. A system as recited in claim 10, wherein the controller is configured and/or programmable to perform an analysis of at least one of temperature information and humidity information, wherein the at least one of temperature information and humidity information is derived from one or more sensors located remotely from a tape drive to be cleaned during the cleaning operation, wherein the controller is configured and/or programmable to make a determination whether to modify a cleaning cycle based on the analysis of the at least one of temperature information and humidity information.

17. A system as recited in claim 16, wherein the at least one of temperature information and humidity information is received by the tape drive, wherein the controller is in the tape drive.

18. A system as recited in claim 10, wherein the controller is configured and/or programmable to perform an analysis of at least one of temperature information and humidity information, wherein one of the temperature information and humidity information is derived from one or more sensors located remotely from a tape drive to be cleaned during the cleaning operation, wherein another of the temperature information and humidity information is derived from one or more sensors located on the tape drive or a canister coupled thereto, wherein the controller is configured and/or programmable to make a determination whether to modify a cleaning cycle based on the analysis of the at least one of temperature information and humidity information.

19. A computer program product, the computer program product comprising:

a computer readable storage medium having program code embodied therewith, the program code readable/executable by a processor to:

receive, by the processor, at least one of temperature information and humidity information about an environment in which a tape drive resides;

perform, by the processor, an analysis of the at least one of temperature information and humidity information;

make, by the processor, a determination whether to modify a cleaning cycle based on the analysis of the at least one of temperature information and humidity information; and make, by the processor, a selection and/or modification of a timing of a cleaning operation for cleaning the tape drive based on the determination.

20. A computer program product as recited in claim 19, wherein the analysis of the at least one of temperature information and humidity information includes determining whether the at least one of temperature information and humidity information is in a predetermined range for a predetermined period of time.

* * * * *